Jan. 17, 1967    K. G. LUSHER    3,298,553
PARTIALLY DEVITRIFIED GLASS ARTICLE AND
METHOD FOR MAKING THE SAME
Filed Nov. 9, 1961
FIG.1
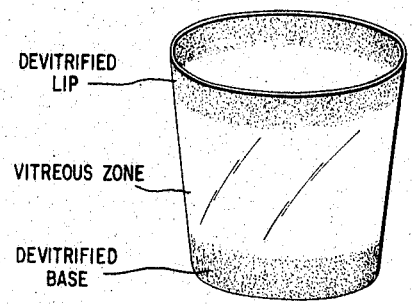
FIG.2
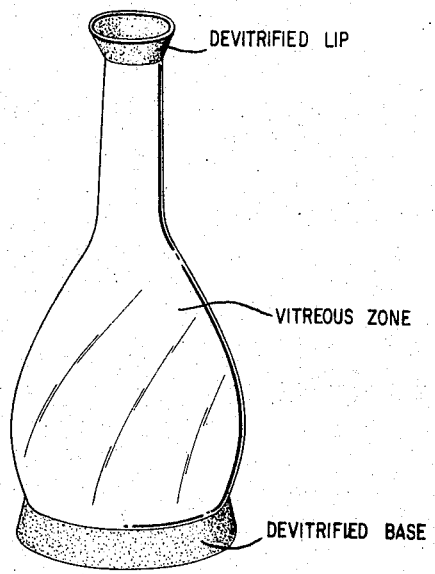
FIG.3
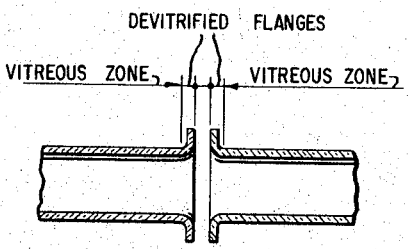
FIG.4
FIG.5
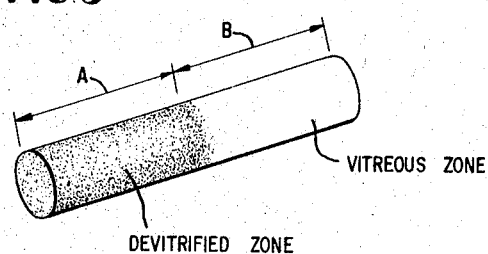
INVENTOR.
KENNETH G. LUSHER
BY
W. A. Schauch and Charles D. Lynch
ATTORNEYS

3,298,553
PARTIALLY DEVITRIFIED GLASS ARTICLE AND METHOD FOR MAKING THE SAME

Kenneth G. Lusher, Perrysburg, Ohio, assignor to Owens-Illinois, Inc., a corporation of Ohio
Filed Nov. 9, 1961, Ser. No. 151,273
15 Claims. (Cl. 215—1)

This invention relates to glass articles which have selected portions or areas that are devitrified and to the method of making the same.

Articles of glass are well known, including containers made therefrom. Such containers whether bottles, cups, tumblers, or carboys frequently break due to rough usage and handling. In general, where breakage occurs, it can ordinarily be attributed to a failure at a selected edge or area which has been subjected to particular stress or strain. Various solutions have been devised such as providing a protective cover or guard over the area which is most likely to break or fracture due to the impact of external forces. However, this and other solutions have had various limitations including increasing the overall bulkiness or size of the container. Accordingly, it would be highly desirable in the glass art to devise a method of making glass articles in which the strength of such articles is increased in those areas which most frequently break, crack or fail due to mechanical impacts.

It is, therefore, an object of this invention to provide glass articles which are more resistant to breakage due to external stresses or forces applied thereto.

A further object of this invention is to provide glass articles which are more resistant to external forces in certain areas than in others.

A further object of this invention is to provide a method of making the aforementioned glass articles.

These and other objects will be apparent from the description which follows:

According to the present invention, glass articles which are characterized by being more resistant to breakage are made by having those areas of the articles subject to the greatest stresses formed of devitrified glass, whereas the remaining areas of the glass articles are formed of vitreous glass. This is effected according to this invention by subjecting selected glasses to a novel heat treating method.

Other objects and advantages of the foregoing invention will become apparent from the following detailed description taken in conjunction with the accompanying drawings in which:

FIG. 1 is an elevational sectional view of a tumbler made in accordance with the present invention;

FIG. 2 is an elevational view of a vase made in accordance with the present invention;

FIG. 3 is a sectional view of matching flanged pipes made in accordance with the present invention;

FIG. 4 is a perspective view of a television tube made in accordance with the present invention; and FIG. 5 is a perspective view of a glass rod devitrified in part according to the present invention and illustrating the gradation in devitrification occurring between the vitreous and devitrified zones.

More specifically, this invention contemplates forming a glass article in accordance with well known glass-forming techniques, such as molding, from a devitrifiable glass composition and thereafter subjecting one or more selected areas or portions of the article formed to a heat-treating process whereby the glass becomes devitrified in those areas so heat treated. As a result, the devitrified areas have greater strength than those which have not been devitrified, and consequently will be more resistant to breakage. Since the devitrified and vitrified areas are derived from or are a part of the original article, that is, are not bonded to one another by some type of sealant, glass or otherwise, these areas can be further described as being integral with said article.

The devitrification or crystallization is effected by heating the selected portions or areas of the formed glass article to temperatures above the annealing temperature of the glass, but below a temperature that will result in any substantial deformation or sagging of the article, for a time sufficient to crystallize inorganic crystalline compounds from the glass and until the selected portion is over 50 percent crystalline material. There is always a glassy matrix and the crystals are formed by crystallization in situ from the glass.

For the purpose of carrying out the present invention, the following glass compositions have been found suitable—

| Components: | Percent by weight |
|---|---|
| $SiO_2$ | 40–70 |
| $Al_2O_3$ | 15–35 |
| $MgO$ | 5–15 |
| $ZrO_2$ | 6–8 |
| $TiO_2$ | 1–1.75 |

In addition, the foregoing glass can have the following modifying components—

| Components: | Percent by weight |
|---|---|
| $SnO_2$ | 0–2 |
| $NaF$ | 0–3 |
| $Na_2O$ | 0–2 |
| $K_2O$ | 0–3 |
| $CaF_2$ | 0–8 |
| $Li_2O$ | 0–5 |
| $LiF$ | 0–5 |
| $B_2O_3$ | 0–5 |
| $KF$ | 0–3 |
| $CaO$ | 0–10 |
| $BaO$ | 0–10 |
| $PbO$ | 0–5 |

Preferably, the aggregate of the silica, alumina, magnesium oxide, zirconia and titania is at least 90 percent of the composition.

By way of example, the following composition is melted and molded into a glass tumbler—

| Component: | Percent by weight |
|---|---|
| $SiO_2$ | 47.2 |
| $Al_2O_3$ | 31.0 |
| $MgO$ | 11.25 |
| $ZrO_2$ | 8.0 |
| $TiO_2$ | 1.5 |
| $NaF$ | 0.73 |
| $SnO_2$ | 0.2 |

Thereafter, the resulting tumbler is then selectively heated at its lip and base, which are the two areas most prone to break due to rough handling and mechanical impacts, by means of an infra-red heater or gradient type furnace until the desired devitrification occurs in these areas. The tumbler is then put into a lehr and cooled to room temperature.

Of course, all types of glass articles having selected devitrified portions or areas are contemplated by this invention. For example, a glass vase (FIG. 2) can have its base and lip area devitrified in the same manner as the tumbler noted above. In addition, the flanged ends of glass pipe can be selectively devitrified by heating the ends of a glass pipe made from devitrifiable glass until crystallization or devitrification of the ends occurs (FIG. 3). Other examples include the edges of the two halves of glass envelopes which constitute a conventional television tube (FIG. 4). These edges ordinarily have a solder applied thereto and thereafter the two halves are joined together to form the completed television tube. These edges are subject to considerable mechanical and heat stress. By devitrifying these edges in the manner described above, greater stresses can be tolerated in these joining edges without deleteriously affecting the finished product or tube. Upon completion of the devitrification, each of the above articles is cooled.

The present invention will be more completely understood by reference to the following specific examples.

EXAMPLE I

A batch having the same composition as that used for the glass tumbler referred to above was melted at a temperature of 2800° F. From the resulting molten mass there was drawn a glass rod of 0.10 inch diameter. After cooling, a 14 inch length (FIG. 5) was cut therefrom and the first half (A) thereof was heat treated as follows:

(1) *Nucleation stage.*—Section A of the glass rod (FIG. 5) was maintained for 1.5 hours at a temperature of 1420° F. corresponding substantially to the annealing point (viscosity of log 13.5). Holding Section A at this temperature leads to the formation of sub-microscopic crystals of the nucleating agent dispersed throughout the glass rod in Section A. During this heating stage and subsequent heating stages, Section B was shielded from this heat treatment.

(2) *Development stage.*—Thereafter Section A of the glass rod was maintained for 1.5 hours at a temperature of 1740° F. which is slightly below the fiber softening point of the glass. During this heat treatment stage, Section A will partially crystallize and a rigid, nonporous crystalline structure is formed predominantly from the base composition ingredients and not from the nucleating agents. The submicroscopic nuclei dispersed in the glassy matrix at the end of the nucleation stage serve as the growth centers for the rigid framework formed during this second or "development stage" of the heat treatment cycle.

(3) *Crystallization stage.*—Finally, Section A is crystallized to substantial completeness by heating the same for 1.5 hours at 1950° F. which is somewhat above the fiber softening point of the original glass batch. The term "substantial completeness" is used to indicate "complete so far as desired." For maximum physical properties, a completeness of 90 to 95% crystalline is usually desired, although the degree of completeness can be varied over a much wider range, 51–98%, by varying the heat treatment to obtain other or different physical properties. This last stage actually results in the conversion of the majority (over 50% by weight) of the composition to a crystalline structure and thus is known as the "crystallization stage."

At the conclusion of the above heat-treating steps and the subsequent cooling of the glass rod, Section A thereof was completely opaque indicating devitrification or crystallization of the glass therein. X-ray analysis revealed that Section A was well devitrified within the range of 90 to 95% crystalline, and that the predominant crystalline phase was mullite with sapphirine and tridymite as secondary phases.

Although the foregoing heat treatment was intended to cover just Section A, it was observed that the line of demarcation with respect to devitrification between Section A and the remainder of the rod was not sharp, indicating that at least some partial devitrification occurred in Section B along the boundary separating Section A from Section B. Of course, the sharpness of this line of demarcation between Sections A and B will depend upon how successful one is in shielding or masking Section B during the heat-treating steps. However, it is important to note that it is characteristic of the products of the invention having selected devitrified or crystallized portions or areas containing over 50 percent crystals, that the line of demarcation between the essentially crystalline portion and the vitreous portion is never sharp, but that the intermediate portions between the highly crystallized selected area and the vitreous areas gradually decrease in crystalline content toward the vitreous portion. This is important because the coefficient of thermal expansion of the essentially crystalline portion is never the same as the coefficient of thermal expansion of the vitreous portion. Thus, if the article were made by joining or fusing, say, a vitreous top portion of a vase to a previously devitrified base portion of the vase, the composite sealed article would be susceptible to relatively easy breakage on appreciable heating or cooling because of the differences in thermal expansion of the parts.

The above example is given by way of specific illustration but it is to be understood that variations in the three-stage heat treatment can be made. Thus, the nucleation stage temperature can vary from about 20° F. below the annealing temperature to about 50° F. above the annealing temperature. Similarly, the development stage temperature can vary from about 10 to 30° F. below the fiber softening point while the third or crystallization stage temperature can range from 150 to 300° F. above the fiber softening point of the glass composition involved. Such variations in heat treatment and compositions are further illustrated by the following examples. In these, the same procedure was used as in Example I, with the same results, even though the particular glass compositions and specific temperatures employed were as set forth below:

EXAMPLE II

| Component: | Percent by weight |
|---|---|
| $SiO_2$ | 46.8 |
| $Al_2O_3$ | 30.8 |
| MgO | 11.2 |
| NaF | 1.0 |
| $ZrO_2$ | 8.0 |
| $TiO_2$ | 1.5 |
| $SnO_2$ | 0.2 |
| $Li_2O$ | 0.5 | and subjecting Section A of the rod to the following heat treatment:

| Heating Stage | Time | Temperature |
|---|---|---|
| Nucleation | 1.5 hrs | 1,420° F. |
| Development | 1.5 hrs | 1,720° F. |
| Crystallization | 1.5 hrs | 1,950° F. |

EXAMPLE III

| Component: | Percent by weight |
|---|---|
| $SiO_2$ | 47.3 |
| $Al_2O_3$ | 31.0 |
| MgO | 11.0 |
| $ZrO_2$ | 8.0 |
| $TiO_2$ | 1.5 |
| $SnO_2$ | 0.2 |
| LiF | 1.0 |

| Heating Stage | Time | Temperature |
|---|---|---|
| Nucleation | 1.5 hrs | 1,450° F. |
| Development | 1.5 hrs | 1,720° F. |
| Crystallization | 1.5 hrs | 1,920° F. |

EXAMPLE IV

| Component: | Percent by weight |
|---|---|
| $SiO_2$ | 47.5 |
| $Al_2O_3$ | 31.3 |
| MgO | 10.7 |
| $MgF_2$ | 1.1 |
| $Li_2O$ | 0.6 |
| $ZrO_2$ | 7.0 |
| $TiO_2$ | 1.5 |
| $SnO_2$ | 0.2 |

| Heating Stage | Time | Temperature |
|---|---|---|
| Nucleation | 1.0 hr | 1,450° F. |
| Development | 1.0 hr | 1,680° F. |
| Crystallization | 1.5 hrs | 1,950° F. |

EXAMPLE V

Component: Percent by weight
- $SiO_2$ —— 46.9
- $Al_2O_3$ —— 27.5
- MgO —— 11.2
- NaF —— 1.0
- $ZrO_2$ —— 8.0
- $TiO_2$ —— 1.5
- $SnO_2$ —— 0.2
- $Li_2O$ —— 0.7
- $B_2O_3$ —— 3.0

| Heating Stage | Time | Temperature |
|---|---|---|
| Nucleation | 1.5 hrs | 1,450° F. |
| Development | 1.5 hrs | 1,700° F. |
| Crystallization | 1.5 hrs | 1,950° F. |

EXAMPLE VI

Component: Percent by weight
- $SiO_2$ —— 46.9
- $Al_2O_3$ —— 30.8
- MgO —— 11.2
- NaF —— 1.0
- $Li_2O$ —— 0.5
- $ZrO_2$ —— 8.0
- $TiO_2$ —— 1.5
- $SnO_2$ —— 0.2

| Heating Stage | Time | Temperature |
|---|---|---|
| Nucleation | 1.5 hrs | 1,420° F. |
| Development | 1.5 hrs | 1,720° F. |
| Crystallization | 1.5 hrs | 1,950° F. |

EXAMPLE VII

Component: Percent by weight
- $SiO_2$ —— 47.6
- $Al_2O_3$ —— 31.3
- MgO —— 11.1
- LiF —— 1.0
- $ZrO_2$ —— 7.0
- $SnO_2$ —— 0.2
- $TiO_2$ —— 1.8

| Heating Stage | Time | Temperature |
|---|---|---|
| Nucleation | 1 hr | 1,450° F. |
| Development | 1 hr | 1,680° F. |
| Crystallization | 1.5 hrs | 1,950° F. |

The foregoing three-stage heat treatments are preferred heat treatments for the particular devitrifiable glasses set forth herein. Various modifications of heat treatments for these disclosed glasses can be effected; thus, it is only necessary to heat the selected area or portion of the glass object to a temperature above the annealing point until over 50 percent crystallization has been effected. As is well understood in the art, the initial heating should not be enough above the annealing temperature to allow any substantial deformation of the article. After the initial heat treatment has caused the formation of some crystals and thereby imparted some further rigidity to the article, its temperature can be gradually raised until the selected portion or area contains over 50 percent crystals. Other examples of useful crystallizable glass compositions are to be found in U.S. Patent 2,920,971, dated Jan. 12, 1960, Examples 1 through 101; U.S. Patent 2,933,857, dated Apr. 26, 1960, Examples 1 through 13; and U.S. Patent 2,960,802, dated Nov. 22, 1960. Using these representative compositions, the disclosed heat treatments can suitably be employed to crystallize the selected portions or areas of the articles of the present invention. Any other suitable thermally crystallizable glass can be employed in the present invention.

In the treatment of certain articles such as vases, varied and unusual ornamental effects can also be obtained by the novel process of this invention. Thus, by the method of the present invention, selected areas or zones of an article such as a vase can be crystallized to contain a major proportion of crystalline material for the ornamental effect.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

What I claim is:

1. An article having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, said crystalline zone having greater strength than the remainder of said article.

2. An article formed of a thermally crystallizable glass having at least one crystalline zone, which is subject in use to relatively high mechanical wear, stress and shock, containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, said crystalline zone having greater strength than the remainder of said article.

3. The glass article of claim 2 in which the article has the following composition—

Component: Percent by weight
- $SiO_2$ —— 40–70
- $Al_2O_3$ —— 15–35
- MgO —— 5–15
- $ZrO_2$ —— 6–8
- $TiO_2$ —— 1–1.75

4. The glass article of claim 2 in which the article has the following composition—

Component: Percent by weight
- $SiO_2$ —— 40–70
- $Al_2O_3$ —— 15–35
- MgO —— 5–15
- $ZrO_2$ —— 6–8
- $TiO_2$ —— 1–1.75
- $SnO_2$ —— 0–2
- NaF —— 0–3
- $Na_2O$ —— 0–2
- $K_2O$ —— 0–3
- $CaF_2$ —— 0–8
- $Li_2O$ —— 0–5
- LiF —— 0–5
- $B_2O_3$ —— 0–5
- KF —— 0–3
- CaO —— 0–10
- BaO —— 0–10
- PbO —— 0–5

5. A glass tumbler having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said glass tumbler, said crystalline zone having greater strength than the remainder of said tumbler.

6. A glass rod having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said glass rod, said crystalline zone having greater strength than the remainder of said rod.

7. A flanged glass pipe having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said flanged glass pipe, said crystalline zone having greater strength than the remainder of said pipe.

8. A glass television tube having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said glass television tube, said crystalline zone having greater strength than the remainder of said television tube.

9. A glass vase having at last one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said glass vase, said crystalline zone having greater strength than the remainder of said vase.

10. A method of forming an article having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, comprising the steps of melting a devitrifiable glass composition, forming the resulting glass into the desired shape, thereafter subjecting certain areas of said article to devitrifying temperature conditions for a time sufficient to form said crystalline and intermediate zones, the other areas of said article being shielded from said temperatures and then cooling the article.

11. A method of forming an article having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, comprising the steps of melting a devitrifiable glass composition, forming the resulting glass into the desired shape, thereafter subjecting certain areas of said article to devitrifying a temperature at about the annealing temperature of said glass article but below that at which deformation of said article would occur and for a period of time sufficient for the formation of inorganic crystals in said glass article, subjecting said certain areas to an increased temperature which is below the fiber softening point of said glass article for a time sufficient for a crystalline structure to form in said glass article and then subjecting said article to a temperature above the fiber softening point of the glass for a time sufficient to cause a major portion of said certain areas of the article to form a crystalline structure, the other areas of said article being shielded from said temperatures, and then cooling the article after the crystalline and intermediate zones are formed therein.

12. A method of forming an article having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, comprising the steps of melting a devitrifiable glass composition, forming the resulting glass into the desired shape, thereafter subjecting certain areas of said article to devitrifying conditions, consisting of (a) nucleating at a temperature from about 20° F. below the annealing temperature to about 50° F. above the annealing temperature of said glass, (b) developing at a temperature of about 10° F. to 30° F. below the fiber softening point of said glass, and (c) crystallizing at a temperature of about 150° to 300° F. above the fiber softening point, and then cooling the thus heat treated article.

13. A method of treating a devitrifiable glass article to form an article having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, comprising the steps of subjecting selected areas of said devitrifiable glass articles to a temperature at about the annealing temperature of said glass article but below that at which deformation of said article would occur and for a period of time sufficient for the formation of inorganic crystals in said glass articles, subjecting said certain areas to an increased temperature which is below the fiber softening point of said glass article for a time sufficient for a crystalline structure to form in said glass article and then subjecting said article to a temperature above the fiber softening point of the glass for a time sufficient to cause a major portion of said certain areas of the article to form a crystalline structure, the other areas of said article being shielded from said temperatures, and then cooling the article after said crystalline and intermediate zones are formed therein.

14. A method of treating a devitrifiable glass article to form an article having at least one crystalline zone containing a major portion of inorganic crystals in a minor portion of a glassy matrix, at least one glassy zone, and an intermediate zone between said glassy zone and said crystalline zone progressively increasing in crystalline content from the glassy zone to the crystalline zone, the three said zones being both integral and derived from said article, comprising the steps of subjecting selected areas of said article to devitrifying conditions, consisting of (a) nucleating at a temperature from about 20° F. below the annealing temperature to about 50° F. above the annealing temperature of said glass, (b) developing at a temperature of about 10° F. to 30° F. below the fiber softening point of said glass, and (c) crystallizing at a temperature of about 150° to 300° F. above the fiber softening point, the other areas of said article being shielded from said temperatures during said treatment, and then cooling the thus heat-treated article after said crystalline and intermediate zones are formed therein.

15. The method as defined in claim 14 wherein said devitrifiable glass article has the following composition—

| Component: | Percent by weight |
|---|---|
| $SiO_2$ | 40–70 |
| $Al_2O_3$ | 15–35 |
| MgO | 5–15 |
| $ZrO_2$ | 6–8 |
| $TiO_2$ | 1–1.75 |

References Cited by the Examiner
UNITED STATES PATENTS

| | | | |
|---|---|---|---|
| 343,133 | 6/1886 | Leighton et al. | 154—57 |
| 1,778,305 | 6/1929 | Blau. | |
| 2,132,390 | 10/1938 | Blau | 65—33 |
| 2,292,684 | 8/1942 | Blau. | |
| 2,311,846 | 2/1943 | Littleton et al. | 154—57 |
| 2,314,804 | 3/1943 | Wilson | 154—57 |
| 2,339,975 | 1/1944 | Blau. | |
| 2,960,801 | 11/1960 | King et al. | 65—33 |
| 2,960,802 | 11/1960 | Voss | 65—33 |
| 3,113,877 | 12/1963 | Janakirawa-Rao. | |
| 3,155,481 | 11/1964 | Boyce | 65—109 X |

FOREIGN PATENTS 1,099,135  2/1961  Germany.

OTHER REFERENCES

Tooley, F. V.: Handbook of Glass Manufacture, vol. II, published by Ogden Publishing Co., New York, N.Y., 1960, pp. 192–199.

DONALL H. SYLVESTER, *Primary Examiner.*

ALEXANDER WYMAN, *Examiner.*

J. M. DULIN, F. W. MIGA, *Assistant Examiners.*